UNITED STATES PATENT OFFICE.

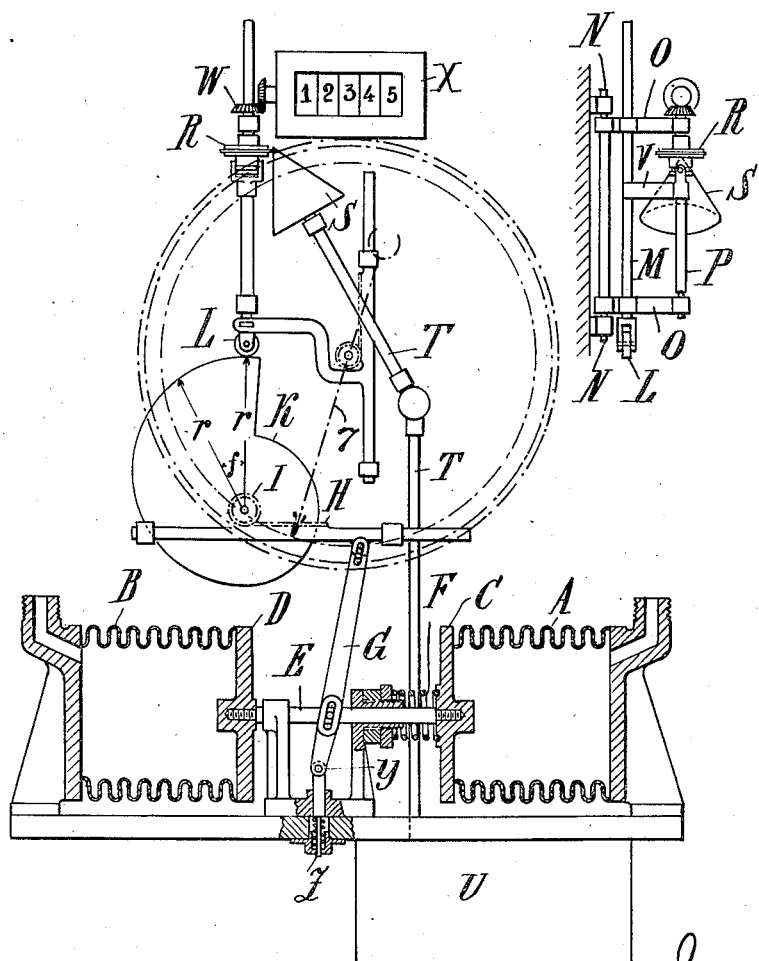

KARL TORSTEN FREDRIK JUNG, OF KALMAR, AND GUSTAF HENRIK PETERSSON, OF STOCKHOLM, SWEDEN.

SPEED-INTEGRATING MECHANISM AND THE LIKE.

1,416,210.  Specification of Letters Patent.  Patented May 16, 1922.

Application filed December 1, 1913, Serial No. 804,078. Renewed April 29, 1919. Serial No. 293,440½.

*To all whom it may concern:*

Be it known that we, KARL TORSTEN FREDRIK JUNG, Kalmar, Sweden, and GUSTAF HENRIK PETERSSON, Stockholm, Sweden, subjects of the King of Sweden, have invented certain new and useful Improvements in Speed-Integrating Mechanism for Ships and the like, of which the following is a specification.

The present invention relates to devices for ascertaining and indicating not only the speed of ships but also the performed distance. For this purpose the common differential-manometers with Bourdon-tube or plane membrane have with normal dimensions too little capacity and furthermore they do not give a deflection exactly proportional to the pressure. This is because the integrating mechanism requires a great deal of work to drive it as compared with the work needed for turning or rotating a pointer or needle, and in order that the errors shall not be noticeable the power consumed by the integrating mechanism must be relatively small compared with the capacity of the driving device, from which it will be evident that the manometer pressure must be magnified for use with integrating mechanism.

The present invention is accordingly illustrated in the accompanying drawing, in which Fig. 1 is a front view of an apparatus embodying my invention and Fig. 2 is a side view of certain parts shown in Fig. 1. Referring more particularly to the drawing, two soft cylindrical bellows A and B are provided, which bellows have movable bottoms C and D, connected with each other through a rod E, the pressure difference being taken up by an adjustable spring F. By this means it is possible to give the bellows bottoms a great stroke and in this manner with moderate bellows diameter receive great capacity of work. The bellows A is in connection with the Pitot conduit and the bellows B with the balancing conduit according to an arrangement previously known in this art. The pressure difference acting upon the rod E and therefore also the movement of this rod will be proportional to the square of the speed of the ship. This movement is suitably transferred in enlarged scale to a rack H movable parallel to the rod E. When stating the distance i. e. integrating the speed in regard to the time, the movement of the rod H, proportional to the square of the speed is transformed to a movement which is proportional to the speed itself. This is effected with the cam wheel K which is rotated by the cog-wheel I and acts with the aid of the pressure roll L upon the rod M. The equation of the cam curve, expressed in polar coordinates and on the presumption that the diameter of the roll is small, is then $$r = r_0 \mp k\sqrt{\alpha}$$

where $r_0$ and $k$ are constants. $\alpha$ can suitably vary between $o$ and $\frac{3}{2}\pi$, when the speed of the ship goes from $o$ to maximum. The rod M is movable in a vertical direction in a frame O, turnable on the taps N and carrying the rotating shaft P, on which the friction wheel R is mounted, so that it can be moved in axial direction but not be turned round the shaft. The frame O is influenced by an adjustable spring (not shown), so that the wheel R with a certain pressure is held in contact with the friction cone S, which is driven by the clockwork U with aid of the shaft T. The rod M is connected to an arm V at right angles thereto and the arm V connects with the shaft P by means of a pin and slot connection permitting the shaft to revolve whereby the movement of the wheel R on the mantle face of the cone with aid of the arm V is effected by the rod M, being so adjusted, that the same when the ship is standing rests against the point of the cone, the movement of the wheel R along the cone and therefore also its revolutions per minute will be proportional to the speed of the ship. The shaft P transfers with aid of the conical gear W the rotation of the wheel R to a calculating work X of the common stroke teller type with zero adjusting mechanism. This calculating work shows then the performed distance in knots or miles.

From the rod M movable proportionally to the speed the movement may be transmitted by any suitable means to the pointer 7, indicating the speed of the ship. The movement of the bellows A and B is transmitted from the rod E to the rack H by means of a floating lever G which is pivotally connected to the rack H and which has a pin and slot connection with the rod E. The lower end of the lever G is pivoted at $y$ to a short spring supported rod $y'$, the spring supporting the rod $y'$ being held in place by a nut Z.

It will be understood that throughout the claims appended hereto, the words "indicator" and "indicating" are used in a broad sense to include registering means and also to include recording means.

Having now particularly performed and ascertained the nature of our said invention and in what manner the same is to be performed we declare that what we claim is:

1. The combination in pressure responsive devices for ships, of a pair of bellows, a rod common to both bellows, a rack parallel to said rod, a driving member intermediate said rod and rack, resilient means secured to one of said bellows adapted to compensate pressure differences, indicating means and operative connections between said rack and indicating means, substantially as described.

2. A pressure responsive mechanism comprising in combination two coaxial bellows each having a fixed and a movable bottom, an indicator, and connections between said bellows and said indicator comprising a rod connecting the movable bottoms of said bellows, a rack parallel with said rod, and a floating lever intermediate said rod and said rack for transmitting motion from the rod directly to the rack.

In testimony whereof we have signed our names to this specification in the presence of two subscribing witnesses.

KARL TORSTEN FREDRIK JUNG.

Witnesses:
AXEL RUNNQUIST,
A. LIDENAU.

GUSTAF HENRIK PETERSSON.

Witnesses:
JOHAN NEUBAUM,
GERTA PRIM.